United States Patent
Kramer et al.

(10) Patent No.: US 7,365,129 B2
(45) Date of Patent: *Apr. 29, 2008

(54) POLYMER SYSTEMS WITH REACTIVE AND FUSIBLE PROPERTIES FOR SOLID FREEFORM FABRICATION

(75) Inventors: Laura Kramer, Corvallis, OR (US); Vladek Kasperchik, Corvallis, OR (US); Melissa D. Boyd, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/686,137

(22) Filed: Oct. 14, 2003

(65) Prior Publication Data

US 2005/0080191 A1    Apr. 14, 2005

(51) Int. Cl.
C08L 23/00 (2006.01)
C08L 23/04 (2006.01)
C08L 25/02 (2006.01)
C08L 33/02 (2006.01)
C08L 33/04 (2006.01)
C08L 35/02 (2006.01)
C08L 37/00 (2006.01)

(52) U.S. Cl. ............... 525/191; 525/208; 525/217; 525/221; 525/222; 525/239; 525/249; 525/241

(58) Field of Classification Search ............... 525/191, 525/208, 217, 221, 222, 239, 240, 241
See application file for complete search history.

(56) References Cited

U.S. PATENT DOCUMENTS

| | | | |
|---|---|---|---|
| 3,676,172 A * | 7/1972 | Van Dyk et al. ............ 427/195 |
| 5,030,394 A * | 7/1991 | Sietses et al. ............... 264/28 |
| 5,204,055 A | 4/1993 | Sachs et al. | |
| 5,340,656 A | 8/1994 | Sachs et al. | |
| 5,387,380 A | 2/1995 | Cima et al. | |
| 5,649,277 A | 7/1997 | Greul et al. | |
| 5,738,817 A * | 4/1998 | Danforth et al. ............ 264/603 |
| 5,900,207 A | 5/1999 | Danforth et al. | |
| 6,004,717 A * | 12/1999 | Creatura et al. ........ 430/137.13 |
| 6,340,720 B1 * | 1/2002 | Lin et al. ..................... 523/335 |
| 6,363,606 B1 | 4/2002 | Johnson, Jr. et al. | |
| 6,375,874 B1 | 4/2002 | Russell et al. | |
| 6,416,850 B1 | 7/2002 | Bredt et al. | |
| 6,471,800 B2 | 10/2002 | Jang et al. | |
| 6,503,677 B1 * | 1/2003 | Gutman et al. ........... 430/108.3 |
| 2002/0016387 A1 | 2/2002 | Shen | |
| 2002/0026982 A1 | 3/2002 | Bredt et al. | |
| 2002/0125592 A1 * | 9/2002 | Schulman et al. ............ 264/16 |
| 2003/0082487 A1 | 5/2003 | Burgess | |
| 2004/0161544 A1 * | 8/2004 | Kasperchik ................. 427/402 |
| 2004/0224173 A1 * | 11/2004 | Boyd et al. ................. 428/500 |
| 2005/0046067 A1 * | 3/2005 | Oriakhi et al. .............. 264/113 |
| 2005/0049739 A1 * | 3/2005 | Kramer er al. ............. 700/119 |
| 2005/0074511 A1 * | 4/2005 | Oriakhi et al. ........... 425/174.4 |

\* cited by examiner

*Primary Examiner*—Nathan M. Nutter

(57) ABSTRACT

A powder system for use in solid freeform fabrication. The powder system includes at least one polymer having reactive properties and fusible properties. The at least one polymer is reactive with a liquid binder and is fusible at a temperature above the melting point or glass transition temperature of the at least one polymer. The at least one polymer may be a single co-polymer having at least one reactive portion and at least one fusible portion or may be a mixture of polymers including at least one reactive polymer and at least one fusible polymer. A method of forming an object by solid freeform fabrication is also disclosed.

8 Claims, 2 Drawing Sheets

POLYMER SYSTEMS WITH REACTIVE AND FUSIBLE PROPERTIES FOR SOLID FREEFORM FABRICATION

FIELD OF THE INVENTION

The present invention relates to a powder system and material system for use in solid freeform fabrication. More specifically, the present invention relates to a powder system and material system having at least one polymer that provides reactive properties and fusible properties.

BACKGROUND OF THE INVENTION

Rapid prototyping or solid freeform fabrication ("SFF") is used to form an object having a complex shape without using a mold or die. SFF is used to produce a three-dimensional ("3-D") object and has been used to create prototypes in a variety of fields, such as the automotive, aerospace, medical, dental and biomedical prostheses manufacturing industries. SFF allows the 3-D object to be produced rapidly and accurately without using a mold or die, which is advantageous because mold processes are expensive and time consuming. While SFF has typically been used to generate prototypes, SFF has also been used to directly produce parts, tools, or molds having precise dimensions and desirable physical properties. Various SFF techniques have been developed, such as stereolithography, selective laser sintering, fused deposition modeling, laminated object manufacturing, and printing techniques. Each of these techniques provides different advantages and disadvantages. For instance, while stereolithography provides 3-D objects that have smooth surface finishes, the technique is slow due to the formation of very thin layers that are cured by a laser. In contrast, a powder-based printing technique is faster but produces 3-D objects that have rough surface finishes. The powder-based printing technique utilizes particles of a powder material to form the 3-D object. However, if the powder particles do not dissolve and if a layer greater than 25 µm is deposited by this printing technique, 3-D objects having very rough surface finishes are produced.

One printing technique uses an inkjet printer to fabricate the 3-D object from thin, two-dimensional ("2-D") layers. A computer is used to generate cross-sectional patterns of the 2-D layers by storing a digital representation of the object in a computer memory. A computer-aided design ("CAD") or computer-aided manufacture ("CAM") software is then used to section the digital representation of the object into multiple, separate 2-D layers. A printer, such as an inkjet printer, is then used to fabricate a layer of material for each layer sectioned by the software. Each of the 2-D layers is formed by applying a powder material on a flat surface or support platform using a roller. The powder material is typically a ceramic, metal, plastic, or composite material. A liquid binder is selectively deposited on the powder material, using a printhead of the inkjet printer, to produce areas of bound powder. Since the liquid binder is only applied to locations where it is needed, the 3-D object is produced faster by printing than by stereolithography. The printing technique is also faster because about 90% of the material is spread in bulk while about 10% of the material is applied by printing. The liquid binder, which is typically a polymeric resin or aqueous composition, is applied in the pattern of the cross-sectional pattern of the 2-D layer. The liquid binder penetrates gaps in the powder material and reacts with the powder particles to create a layer bound in two dimensions. As the reaction proceeds, the binder also bonds each successive 2-D layer to a previously deposited 2-D layer. Additional 2-D layers are formed by repeating the steps of depositing additional powder material and applying the binder solution until the desired number of layers is produced. Since the liquid binder is selectively applied to the powder material, only certain areas of the powder material are bound within the layer and onto the previous layer. After the 3-D object is formed, unbound powder is subsequently removed. One example of a printing technique is known in the art as three-dimensional printing or 3DP™. While 3-D objects have been effectively made by printing, the powder materials and liquid binders that are currently used are problematic. For instance, 3-D objects produced with the powder materials have a rough surface finish due to the particulate nature of the powder materials. In addition, the 3-D objects are typically porous because the powder materials do not pack completely and have limited interactions occurring at the surfaces of the particles. The porous nature and limited surface interaction of the powder materials result in the formation of 3-D objects that have poor mechanical properties. Furthermore, the liquid binder is typically aqueous based, which causes the 3-D object to be sensitive to moisture in the environment and to have reduced environmental robustness. To improve the surface finish, density, mechanical properties, and environmental robustness of the 3-D object, coating or infusion post-treatments have been used. However, these treatments add additional processing steps and cost to the formation of the 3-D object.

BRIEF SUMMARY OF THE INVENTION

The present invention relates to a powder system for use in solid freeform fabrication, comprising:
at least one polymer having reactive properties and fusible properties, wherein the at least one polymer is selected to be reactive with a liquid binder and is fusible at a temperature above the melting point or glass transition temperature of the at least one polymer.

The present invention further relates to a powder system for use in solid freeform fabrication, comprising:
at least one polymer having either reactive properties or fusible properties, wherein the at least one polymer is selected to be reactive with a liquid binder or is selected to be fusible at a temperature above the melting point or glass transition temperature of the at least one polymer.

In addition the present invention relates to a material system for use in solid freeform fabrication, comprising:
a liquid binder and at least one polymer that reacts with the liquid binder and is fusible at a temperature above the melting point or glass transition temperature of the at least one polymer.

Furthermore, the present invention relates to a material system for use in solid freeform fabrication, comprising:
a liquid binder and at least one polymer that either reacts with the liquid binder or is fusible at a temperature above the melting point or glass transition temperature of the at least one polymer.

Also, the present invention relates to a method of forming an object by solid freeform fabrication, comprising:
applying a powder system comprising at least one polymer having reactive properties and fusible properties to a flat surface;
applying a liquid binder to the powder system to form a solid layer; and
fusing the solid layer.

Additionally, the present invention relates to a method of forming an object by solid freeform fabrication, comprising:

applying a powder system comprising at least one polymer having either
reactive properties or fusible properties to a flat surface;
applying a liquid binder to the powder system to form a solid layer; and
fusing the solid layer.

DETAILED DESCRIPTION OF THE INVENTION

A powder system for use in forming an object by SFF is disclosed. A material system including the powder system and a liquid binder for use in SFF is also disclosed. The powder system is polymer-based and may include at least one polymer that provides reactive properties and fusible properties. The reactive properties of the polymer provide the powder system with the ability to react with the liquid binder, which causes initial setting of the object. The fusible properties of the polymer provide the ability to fuse the powder system to produce the object having improved density, mechanical properties, surface finish, and environmental robustness.

The powder system may include one polymer having both the reactive properties and the fusible properties. If the powder system includes one polymer, the polymer may be a copolymer that possesses both the reactive and the fusible properties. For instance, the polymer may include at least one reactive portion and at least one fusible portion. The polymer having both the reactive and the fusible properties may include, but is not limited to, a random, block, or graft co-polymer. Examples of co-polymers having both properties include, but are not limited to, poly(ethylene-co-vinyl alcohol) and poly(ethylene co-methacrylic acid). Poly(ethylene-co-vinyl alcohol) is available from Sigma-Aldrich Chemical Co. (St. Louis, Mo.) or Polysciences Inc. (Warrington, Pa.). Poly(ethylene co-methacrylic acid) is available from E.I. du Pont de Nemours & Company (Wilmington, Del.) as Nucrel® 1202 HC or Surlyn®. The powder system 2 may also include two or more polymers with at least one of the polymers providing the reactive properties and at least one of the polymers providing the fusible properties. If the powder system includes two or more polymers, at least one of the polymers may react when exposed to the liquid binder, which causes initial setting of the object. This polymer is referred to herein as a "reactive polymer" or a "reactive powder fraction." In addition, one or more of the polymers may be fusible and is referred to herein as a "fusible polymer" or a "fusible powder fraction." The fusible polymer(s) may be melted or fused after the object is formed to improve the density of the object. Thermoplastic particles coated with a reactive polymer or block or graft co-polymers having core-shell morphologies may also be used in the present invention.

Figure 1:
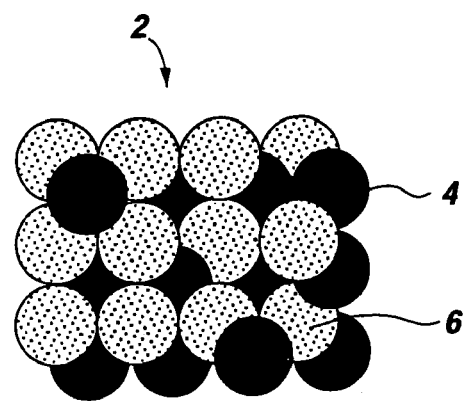
FIGS. 1-6 are schematic illustrations of particular embodiments of the powder system and material system of the present invention.

As shown in FIG. 1, the powder system 2 of the present invention may include the reactive polymer 4 and the fusible polymer 6. While the powder system 2 is illustrated as having two polymers, the powder system 2 may include a single polymer having both the reactive and fusible properties or may include more than two polymers. The reactive polymer 4 and the fusible polymer 6 may each have a particle size ranging from approximately 15 µm to approximately 50 µm. The polymers may have a distribution of particle sizes within this particle size range. A majority, such as up to approximately 90%, of the powder system 2 may include polymer particles in this particle size range. The remainder of the powder system 2 may include polymer particles having a small particle size to increase the reactivity and improve fusing of the material system. It is believed that using reactive polymers 4 having a small particle size may increase the reactivity of the powder system 2 because the high surface area is available for reacting with the liquid binder. In addition, fusible polymers 6 having the small particle size may segregate to the edges of the object, where they may provide the most benefit for smoothing the surface of the object. The remainder of the powder system 2 may include polymer particles having a particle size of less than approximately 15 µm, as a non-limiting example, a particle size ranging from approximately 7 µm to less than approximately 15 µm. Examples of polymers that may be used as the reactive polymer 4 include, but are not limited to, a cationic polyelectrolyte; a mixture of cationic and anionic polyelectrolytes; a polymer having an epoxy functionality, such as poly(glycidyl methacrylate); a polymer having a primary amino group; polyvinyl alcohol ("PVOH"), or mixtures thereof. The cationic polyelectrolyte may include, but is not limited to, a polyquaternary ammonium salt, a cationic polyamine, a polyamidin, a cationic acrylic copolymer, a guanidine-formaldehyde polymer, polydimethyl diallylammonium chloride, diacetone acrylamide-dimethyldiallyl ammonium chloride, polymaleic anhydride, polyethyleneimine, and a polyethyleneimine adduct with epichlorhydrin. The anionic polyelectrolyte may be polyacrylic acid. The reactive polymer 4 may be commercially available from numerous sources as: Rohagit® KF 720F, which is a high molecular weight, cationic polyelectrolyte based on a methacrylate quaternary ammonium compound and is available from Degussa AG (Germany); Rohagit® KF SHV, which is an anionic polyelectrolyte based on an alkali-soluble methacrylic acid copolymer and is available from Degussa AG (Germany); or PVOH, which is available as Celvol™ 205S or Celvol™ 523S from Celanese Chemicals, Ltd. (Dallas, Tex.), or from Sigma-Aldrich Chemical Co. (St. Louis, Mo.). The PVOH used in the present invention may have a molecular weight ranging from approximately 20,000 to approximately 250,000. Desirably, the PVOH has a molecular weight less than approximately 200,000, such as from approximately 25,000 to approximately 133,000.

The powder system 2 may include a sufficient amount of the reactive polymer 4 to maintain the integrity of the object during fusing. For instance, the reactive polymer 4 may be present in the powder system from approximately 5% by weight ("wt %") to approximately 75 wt %. In one particular embodiment, the reactive polymer may be present from approximately 15% wt % to approximately 75 wt %.

The fusible polymer 6 in the powder system 6 may be a polymeric material that is soft at a temperature above room temperature. As such, the fusible polymer 6 may have a low melting point, softening point, or glass transition temperature ("$T_g$"). The fusible polymer 6 may have a melting point or $T_g$ ranging from approximately 50° C. to approximately 250° C. Desirably, the melting point or $T_g$ ranges from approximately 50° C. to approximately 150° C. More desirably, the melting point or $T_g$ ranges from approximately 75° C. to approximately 100° C. The fusible polymer 6 may be a hydrophobic polymer, such as a thermoplastic polymer.

The thermoplastic polymer may include, but is not limited to: an acrylate polymer or copolymer; a methacrylate polymer or copolymer, such as polymethylmethacrylate ("PMMA"); vinyl/vinylidene chloride copolymers; poly (styrene-co-butyl-acrylate) ("SBA"); polyesters; low melting polyolefins, such as low melting polypropylenes, polyethylene, polymethylpentenes, polystyrenes, or polybutylenes; polyurethanes; polyether-ester elastomers; poly(vinyl acetate), ethylene-vinyl acetate co-polymers, and additional vinyl ester polymer or copolymers; or mixtures thereof. For instance, the thermoplastic polymer may be SBA, PMMA, or mixtures thereof. SBA is commercially available or may be synthesized by conventional techniques, such as by a free radical polymerization. A PMMA-containing copolymer is available as Degalan® P28 from Degussa AG (Germany). PMMA is also available from Sigma-Aldrich Chemical Co. (St. Louis, Mo.) or Polysciences Inc. (Warrington, Pa.). The fusible polymer 6 may be present in the powder system 2 in an amount sufficient to provide improved mechanical properties to the object. For instance, the fusible polymer 6 may be present in the powder system 2 from approximately 25% by weight ("wt %") to approximately 95 wt %. If the powder system 2 includes more than approximately 50% fusible polymer 6, the powder system 2 may invert phases during fusing. The phase inversion seals in porosity and encapsulates the reactive polymer 4. As used herein the term "phase inversion" refers to the ability of the powder system 2, which includes hydrophilic and hydrophobic components, to adjust its surface character to the outside environment in order to minimize its surface energy. For instance, when the reactive polymer 4 includes both hydrophilic and hydrophobic segments and is exposed in a dry environment to a temperature higher than the $T_g$ or melting point of the fusible polymer 6, the hydrophobic segments may become exposed to the surface while the hydrophilic segments may be hidden below the surface. The phase inversion of the powder system 2 is described in more detail below.

In one embodiment, the powder system 2 includes PMMA as the fusible polymer 6 and PVOH as the reactive polymer 4. In another embodiment, the powder system 2 includes PMMA as the fusible polymer 6 and a cationic polyelectrolyte as the reactive polymer 4.

The powder system 2 may be formulated by mixing the reactive polymer 4 and the fusible polymer 6, such as by hand mixing or other conventional mixing techniques. Before mixing, these polymers may be ground to the desired particle size, such as by using a planetary ball mill or by cryogenic grinding. The powder system 2 may be deposited in a layer onto a flat surface or support platform by conventional techniques. For instance, the powder system 2 may be applied to the flat surface by sprinkling the powder system 2 or spreading the powder system 2 using a roller.

As previously mentioned, the liquid binder may be used with the powder system 2 to form the object. The liquid binder may be present in the material system in an amount ranging from approximately 3% to approximately 20% relative to the powder system 2. The liquid binder and the powder system 2 may form a material system for use in SFF. The liquid binder may be water or an aqueous-based solution having at least one organic or inorganic additive that is reactive with the reactive polymer 4. For instance, if PVOH is used as the reactive polymer 4, the additive may be an acid that reacts with PVOH. The liquid binder may also include additional components, such as colorants or surfactants. The liquid binder may have a low viscosity so that it may be applied with the printhead of the inkjet printer. The liquid binder may also be selected to quickly penetrate the layer of the powder system 2 so that the additive is able to activate the reactive polymer 4 quickly, which allows subsequent layers of the object to be formed quickly. The additive in the liquid binder may be boric acid, an anionic polyelectrolyte, a cationic polyelectrolyte, an amine, a compound having at least two aldehyde functionalities, or mixtures thereof. Examples of amines that may be used include, but are not limited to, diamines, such as hexamethylene diamine or higher functionality amines. An example of a compound having at least two aldehyde functionalities includes, but is not limited to, glutaric dialdehyde. Glutaric dialdehyde is soluble in water and readily crosslinks polymeric compounds having primary amino groups. The additive may be present in the liquid binder at a low concentration, such as from approximately 1% to approximately 10%.

In one embodiment, the liquid binder may include: water; dimethyl succinate; surfactants such as Tergitol 15-S-7, Tergitol 15-S-5, and/or Dowfax 8390; polyethylene glycol; and one or more dyes, such as H1189, TMA-DB-199, and/or M377. In another embodiment, the liquid binder may include: water; dimethyl succinate; surfactants such as Tergitol 15-S-7, Tergitol 15-S-5, and/or Dowfax 8390; polyethylene glycol; one or more dyes, such as H1189, TMA-DB-199, and/or M377; and 3% boric acid. In another embodiment, the liquid binder may include: water; dimethyl succinate; surfactants such as Tergitol 15-S-7, Tergitol 15-S-5, and/or Dowfax 8390; polyethylene glycol; one or more dyes, such as H1189, TMA-DB-199, and/or M377; and 5% polyacrylic acid.

Various combinations of the powder system 2 and the liquid binder may be contemplated for use in the present invention. For sake of example only, if the reactive polymer 4 includes a cationic polyelectrolyte, the liquid binder may include an anionic polyelectrolyte. If the reactive polymer 4 includes both cationic and anionic polyelectrolytes, water may be used as the liquid binder. When the water dissolves the polyelectrolytes, the polyelectrolytes may react with each other to form a solid. If the reactive polymer 4 is PVOH, boric acid may be used as the liquid binder. When the boric acid reacts with the PVOH, a layer having a cross-linked matrix of PVOH is formed. If an epoxy functionality is used as the reactive polymer 4, the liquid binder may be a curing agent, such as an amine or a multifunctional aldehyde.

Figure 2:
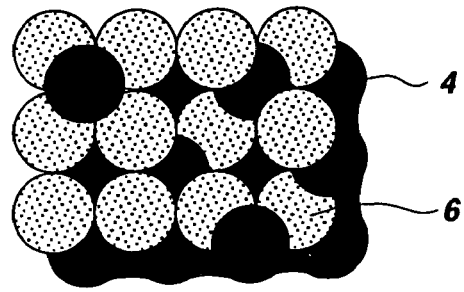

When the liquid binder is applied to the powder system 2, the reactive polymers 4 may become activated so that they react and form a layer of the object, as shown in FIG. 2. In other words, the reactive polymers 4 become attached or bonded to one other, such as through ionic or covalent bonds. The reaction may also cause an initial setting of the object. The liquid binder may be applied by inkjet printing, such as by using a continuous inkjet printer or a drop-on-demand inkjet printer. For instance, the printer may include a conventional thermal inkjet printhead. The printer may be modified so that it is capable of spreading the powder system 2 in addition to ejecting droplets of the liquid binder. Droplets of the liquid binder having a size as low as 4 ng may be deposited by the inkjet printer. Printing of the liquid binder is known in the art and, as such, is not described in detail herein. By printing the liquid binder, the liquid binder may be selectively applied to desired locations of the layer of the powder system 2.

In one embodiment, the material system includes PMMA as the fusible polymer 6, PVOH as the reactive polymer 4, and boric acid in the liquid binder.

In another embodiment, the material system includes PMMA as the fusible polymer 6, a cationic polyelectrolyte as the reactive polymer 4, and an anionic polyelectrolyte in the liquid binder.

Figure 3:
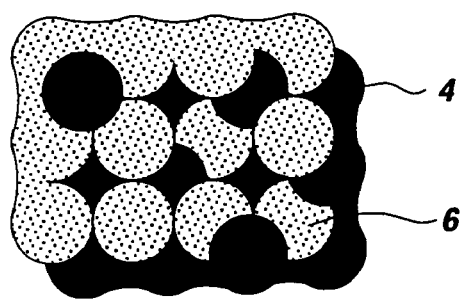

Once the layer of the powder system 2 has reacted with the liquid binder, an additional layer of the powder system 2 may be deposited and reacted with the liquid binder, as previously described. This sequence of depositing the powder system 2 and printing the liquid binder may be repeated until the object has a desired shape. Each layer of the object may have a thickness ranging from approximately 25 µm to approximately 200 µm, depending on a maximum particle size of the polymer particles in the powder system 2. Once the desired number of layers has been deposited, the object may be heated to fuse or melt the object. Heat may be provided by a heat source, such as an oven or a heat gun. The object may be heated to a temperature above the melting point or $T_g$ of the fusible polymer 6, which causes the fusible polymer 6 to flow, as shown in FIG. 3. The temperature to which the object is exposed may be above the melting point or $T_g$ of the fusible polymer 6 so that the fusible polymer 6 flows and consolidates. However, the temperature should not be so high above the melting point or $T_g$ that the object deforms as it is being fused.

Since a majority of the material system is applied mechanically, such as by spreading, this technique of forming the object may be faster than other printing techniques, which require that the entire material system be printed or jetted. With the present invention, the object may be formed by spreading from approximately 80% to approximately 97% of the material system, while approximately 3% to approximately 10% of the material system may be applied by printing or jetting.

Fusing the object may provide an improved surface finish to the object because, as the fusible polymer 6 melts, the particulate nature of the powder system 2 is altered. The density of the object may also be increased because, as the fusible polymer 6 melts, more complete packing of the powder system 6 may be achieved. In addition, the mechanical properties of the object may be improved. The mechanical properties of the object may be similar to the mechanical properties of the fusible polymer 6 used in the powder system 2. The environmental robustness of the object may also be improved because the fusible polymer 6 creates a hydrophobic skeleton inside the object after the object is fused. The hydrophobic skeleton provides mechanical properties to the object that may be more resistant to environmental moisture. In addition, fusing removes porosity from the object and prevents moisture from entering the object. It is believed that these improved properties are provided by the homogenous distribution of the fusible polymer 6 in the object.

Figure 4:
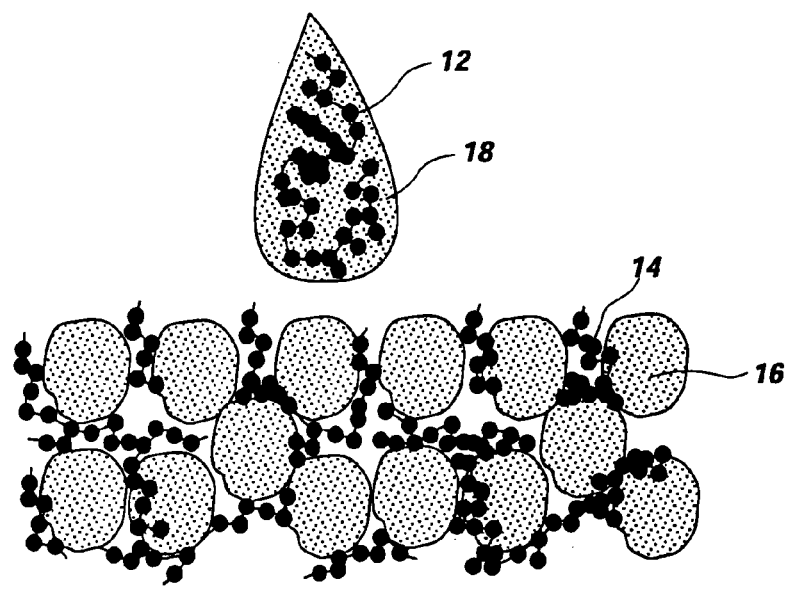

It is also contemplated that at least one of the polymers in the powder system 2 may be dissolved in the liquid binder and applied using the inkjet printer. Either the reactive polymer 4 or the fusible polymer 6 may be dissolved in the liquid binder. For instance, if the powder system 2 includes polyelectrolytes as the reactive polymer 4 and the fusible polymer 6, one of the polyelectrolytes may be dissolved in the liquid binder. It is further contemplated that if more than one polymer is used as the reactive polymer 4, one of the reactive polymers 4 may be dissolved in the liquid binder. Another of the reactive polymers 4 may be mixed into the powder system 2. For instance, if the powder system 2 utilizes cationic and anionic polyelectrolytes as the reactive polymer 4, one of the polyelectrolytes 12 may be dissolved in the liquid binder while the other polyelectrolyte 14 may be contained in the powder system 2, as shown in FIG. 4.

The polyelectrolyte 14 in the powder system 2 may have a charge opposite to that of the polyelectrolyte 12 dissolved in the liquid binder. In addition to having the polyelectrolyte 14, the powder system 2 may also include the fusible polymer 6.

Alternatively, the polymer particles 16 may be core-shell polymer particles and have one of the polyelectrolytes 14 attached to its surface. Core-shell polymers are known in the art and may be commercially available from numerous sources. As used herein the term "core-shell polymer" refers to a polymer having a hydrophilic shell and a fusible hydrophobic core. The hydrophilic shell may be a hydrophilic polymer that includes, but is not limited to, a functionalized hydrophilic derivative of a polyolefin, a polyester, a polyvinyl halide, or an acrylic. For instance, the hydrophilic polymer may be polyvinyl pyrrolidone, poly(2-ethyl-2-oxazoline), polyvinyl alcohol, acrylic polymers, copolymers that have hydrophilic groups (hydroxy or carboxy groups), cellulose polymers, starch, gelatin, albumin, casein, cation starch, natural resins such as gum arabic and sodium alginate, polyamide, polyacrylamide, polyethylene imine, polyvinyl pyridylium halide, melamine resins, polyurethane, polyester, sodium polyacrylate, or mixtures thereof. The fusible hydrophobic core may be a water-insoluble, hydrophobic fusible polymer including, but not limited to, acrylic resins, styrenic resins, or cellulose derivatives, such as cellulose acetat, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as, polyesters, including polyethylene terephthalate, polybutylene terephthalate, polyurethanes and polycarbonates, or mixtures thereof. For sake of example only, the fusible hydrophobic core may be a copolymer of ethylene and vinyl acetate or a styrene-butadiene copolymer.

The core-shell polymer may have a hydrophilic, or wettable, surface and may be fusible, or less polar, on an inside surface of the core-shell polymer. For sake of example only, the polyelectrolyte 14 attached to the surface of the polymer particles 16 may include long-polymer chains that have anionic groups, as shown in FIG. 4.

The other polyelectrolyte 12 may be dissolved in the liquid binder 18. The liquid binder 18 may also include water and an organic solvent capable of swelling or plasticizing the polymer particles 16 in the powder system 2. For sake of example only, the polyelectrolyte 12 dissolved in the liquid binder 18 may include cationic groups. This polyelectrolyte 12 may include short and branched (or hyperbranched) polymer chains so that the viscosity of the liquid binder 18 remains low, which allows the liquid binder 18 to be deposited by inkjet printing.

Figure 5:
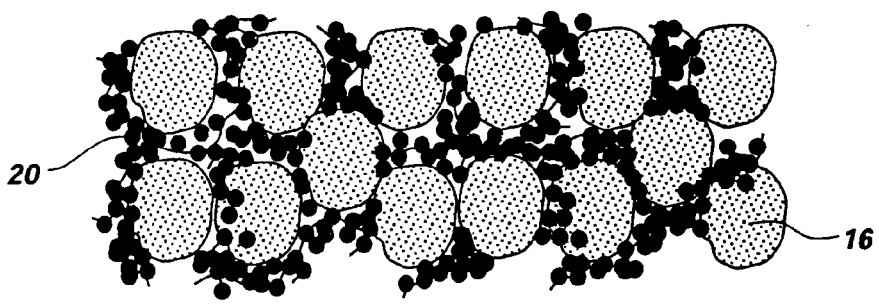

The powder system 2 may be applied to the flat surface to deposit the polymer particles 16. The liquid binder 18 may then be selectively printed onto the polymer particles 16. Since the polyelectrolytes 12,14 have opposite charges, strong coulombic interactions may occur between the polyelectrolytes 12,14, forming a water-insoluble polycomplex 20, as shown in FIG. 5. The water-insoluble polycomplex 20 may form quickly after the polyelectrolytes 12,14 contact each other and may instantly fix or bind together the polymer particles 16. If any of the polymer particles 16 in the powder system 2 remain unbound, they may be separated by dusting off the object.

Figure 6:
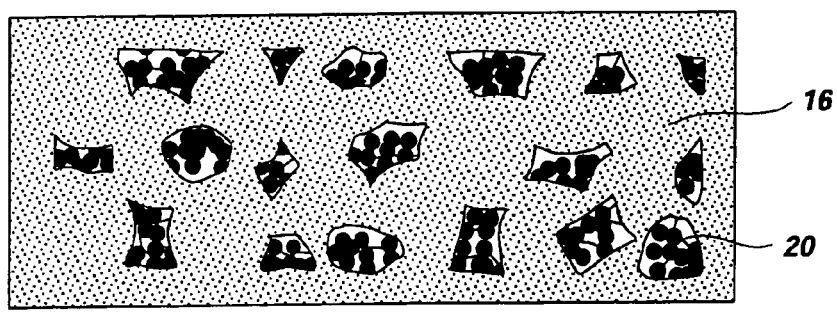

The object may undergo controlled heating to fuse the object. The object may be heated to a temperature above the melting point or $T_g$ of the fusible polymer 6, as previously described. The heat may initially cause water to evaporate from the object and then may cause the polymer particles 16 in the object to melt or coalesce, as shown in FIG. 6. During heating, phase inversion may occur to seal porosity and encapsulate the water-insoluble polycomplex 20, as previously mentioned. After fusing, the surface of the object may be smooth and waterproof.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A powder system for use in solid freeform fabrication, consisting essentially of:
   at least one first polymer powder having reactive properties and at least one second polymer powder having fusible properties, wherein the at least one first polymer comprises at least one reactive polymer and wherein the at least one second polymer comprises at least one fusible polymer, the at least one reactive polymer selected from the group consisting of a cationic polyelectrolyte, a mixture of cationic and anionic polyelectrolytes, a polymer having an epoxy functionality, a polymer having a primary amino group, and mixtures thereof and the at least one fusible polymer selected from the group consisting of an acrylate polymer or copolymer, a copolymer of vinyl/vinylidene chloride, poly(styrene-co-butyl-acrylate), a polyester, a low melting polyolefin, a polyurethane, a polyether-ester elastomer, poly(vinyl acetate), an ethylene-vinyl acetate co-polymer, a vinyl ester polymer, a vinyl ester copolymer, and mixtures thereof and wherein the at least one first polymer is selected to be reactive with a liquid binder and wherein the at least one second polymer is selected to be fusible at a temperature above the melting point or glass transition temperature of the at least one second polymer.

2. The powder system of claim 1, wherein the at least one first polymer powder comprises a single polymer.

3. The powder system of claim 2, wherein the single polymer is poly(ethylene-co-vinyl alcohol) or poly(ethylene co-methacrylic acid).

4. The powder system of claim 1, wherein the at least one fusible polymer has a melting point or glass transition temperature ranging from approximately 50° C. to approximately 250° C.

5. The powder system of claim 1, wherein the at least one fusible polymer is present in the powder system from approximately 25% by weight to approximately 95% by weight.

6. The powder system of claim 1, wherein both the at least one first polymer powder and the at least one second polymer powder have a particle size ranging from approximately 15 μm to approximately 50 μm.

7. A powder system for use in solid freeform fabrication, consisting essentially of:
   at least one first polymer powder having reactive properties and at least one second polymer powder having fusible properties, wherein the at least one first polymer comprises at least one reactive polymer and wherein the at least one second polymer comprises at least one fusible polymer, wherein the at least one reactive polymer is polyacrylic acid, wherein the at least one fusible polymer is selected from the group consisting of an acrylate polymer or copolymer, a copolymer of vinyl/vinylidene chloride, poly(styrene-co-butyl-acrylate), a polyester, a low melting polyolefin, a polyurethane, a polyether-ester elastomer, poly(vinyl acetate), an ethylene-vinyl acetate co-polymer, a vinyl ester polymer, a vinyl ester copolymer, and mixtures thereof, and wherein the at least one first polymer is selected to be reactive with a liquid binder and wherein the at least one second polymer is selected to be fusible at a temperature above the melting point or glass transition temperature of the at least one second polymer.

8. A powder system for use in solid freeform fabrication, consisting essentially of:
   at least one first polymer powder having reactive properties and at least one second polymer powder having fusible properties, wherein the at least one first polymer comprises at least one reactive polymer present in the powder system from approximately 5% by weight to approximately 75% by weight and wherein the at least one second polymer comprises at least one fusible polymer, the at least one reactive polymer selected from the group consisting of a cationic polyelectrolyte, a mixture of cationic and anionic polyelectrolytes, a polymer having an epoxy functionality, a polymer having a primary amino group, and mixtures thereof and the at least one fusible polymer selected from the group consisting of an acrylate polymer or copolymer, a copolymer of vinyl/vinylidene chloride, poly(styrene-co-butyl-acrylate), a polyester, a low melting polyolefin, a polyurethane, a polyether-ester elastomer, poly(vinyl acetate), an ethylene-vinyl acetate co-polymer, a vinyl ester polymer, a vinyl ester copolymer, and mixtures thereof, and wherein the at least one first polymer is selected to be reactive with a liquid binder and wherein the at least one second polymer is selected to be fusible at a temperature above the melting point or glass transition temperature of the at least one second polymer.

\* \* \* \* \*

UNITED STATES PATENT AND TRADEMARK OFFICE
CERTIFICATE OF CORRECTION

PATENT NO. : 7,365,129 B2  Page 1 of 1
APPLICATION NO. : 10/686137
DATED : April 29, 2008
INVENTOR(S) : Laura Kramer et al.

It is certified that error appears in the above-identified patent and that said Letters Patent is hereby corrected as shown below:

In column 9, line 44, in Claim 1, after "thereof" insert -- , --.

Signed and Sealed this

Twenty-eighth Day of April, 2009

JOHN DOLL
*Acting Director of the United States Patent and Trademark Office*